United States Patent Office 3,296,046
Patented Jan. 3, 1967

3,296,046
METHOD OF TACK SEALING BIAXIALLY ORIENTED POLYPROPYLENE FILM
Hillard W. Pouncy, Jr., Somerset, N.J., assignor to Union Carbide Corporation, a corporation of New York
No Drawing. Filed Apr. 22, 1963, Ser. No. 274,859
5 Claims. (Cl. 156—82)

The present invention relates to a method of heat sealing highly biaxially oriented polypropylene film. More particularly, the present invention relates to a method of "tack sealing" high biaxially oriented polypropylene at a temperature below which such film deorients or shrinks.

Tack sealing is distinguished from fusion sealing in that tack sealing is produced as a result of chemical attraction whereas fusion sealing is the result of physical linkage produced through the overlapping of polymer chains between the pieces bonded. The tack seal is a surface seal. The fusion seal is a homogeneous seal. While the tack does not always produce as strong a bond as the fusion seal, it is sufficiently strong to meet the requirements of the packaging industry.

Thin polypropylene films have a relatively low permeability to gases, vapors and liquids, and a relatively high degree of surface hardness, elasticity and abrasion resistance. Since these properties are highly desired in a packaging film, it would be expected that these films would gain immediate acceptance in the packaging industry. Such a film, however, has one serious drawback: It exhibits low mechanical properties, such as tear resistance and impact resistance. This deficiency has been overcome by stressing or stretching the film, thereby orienting it and improving these properties.

When such oriented film is heated to temperatures at or near the melting point however, it shrinks causing distortion. This shrinkage has precluded the use of the ordinary methods of heat sealing or welding plastic film.

Several methods of heat sealing oriented polypropylene film have been proposed in the past. One such method has been to clamp the films to be sealed and then to fusion seal the edges extending beyond the clamp. This method produces an undistorted seal but is slow, requiring accurate clamping and results in an unsightly bead at the seal which is not oriented. Another method of heat sealing these films has been to coat the interface surfaces of the films with a polymer having a melting point substantially below the melting point of the polypropylene film, and then effecting the seal by bonding coating to coating. This method also has deficiencies. The bond or seal is not a polypropylene-polypropylene bond and the method either requires the use of expensive coated or laminated film or requires additional coating steps in the sealing process.

In accordance with the present invention biaxially oriented polypropylene film can be tack sealed by first conditioning the surface of the polypropylene film with Corona discharge until said surface can be wet by a liquid having a surface tension of from 43 to 70 dynes/cm. and preferably from 45 to 50 dynes/cm., placing pieces of the treated film in intimate contact such that at least one treated surface is a contact surface, and heating the junction to a temperature of from 235 to 255° F. inclusive.

The two films are held in intimate contact during the sealing operation as noted above. The contact pressure necessary for this contact should be above 1 pound per square inch and is generally of from 5 to 50 p.s.i. or more.

The Corona discharge used to condition the surface of the polypropylene film is of the type that is generally used to increase the adherence of coating materials such as printing inks and the like, to polyolefin films. Such treating techniques are well known in the art. The discharge may be affected by either alternating or direct current. A discharge device and treating procedure of the alternating current type is disclosed in U.S. 3,018,189 issued on January 23, 1962, to George W. Traver.

Corona discharge occurs when air or gas is subjected to a potential gradient sufficiently high to ionize it. When air is ionized, it becomes a conductor capable of carrying current. When a dielectric is placed between the electrode and ground the Corona is spread over the surface of the dielectric. In the treatment of film surface the film serves as the dielectric.

In the art, the ground rod of the discharge apparatus has generally been coated with a plastic material to additionally increase the Corona effect. It should be noted that applicant has found that an iron ground rod or bar which has been coated with porcelain glaze produces an exceptionally even discharge corona promoting a more even treatment of the film. It has additionally been found that the corona appears to be much stronger, effecting much higher levels of treatment at the same power levels relative to the polyester coated iron ground bar or rod. The advantages of such a rod in the treatment of any film is self evident.

The ground rod should be coated with from 5 to 100 mils of ceramic porcelain glaze and preferably from 40 to 70 mils to produce optimum corona effect. The application of such coatings is well known in the art and has been so for more than 50 years.

The degree of electrostatic treatment of the biaxially oriented polypropylene film is critical. While a conditioning of the surface of the film, to wet with a liquid having a surface tension of 43 dynes/cm. will permit the surfaces of the film to be tack sealed, the strength of the seal is too low to withstand the minimum stress acceptable for packaging film. Treatment of the film surface to an extent that it will wet with a liquid having a surface tension above 70 dynes/cm. will likewise permit the film to be tack sealed, but again the seal is too weak to be of any general use. In order to condition the surface of the film to the extent necessary to permit tack sealing of high strength, the film should be treated until it can be wet by a liquid having a surface tension of at least 43 dynes/cm. and no greater than 70 dynes/cm. and preferably from 45 dynes/cm. to 56 dynes/cm. It has been found that optimum seals are obtained when the film surface has been treated to the extent that it can be wet by a liquid having a surface tension of from 48 to 52 dynes/cm. inclusive.

Liquids which have been found to be exceptionally useful in determining the wetability of films are as follows:

TABLE I

| Formamide, Percent by Volume | Cellosolve, Percent | Surface Tension, dynes/cm. |
|---|---|---|
| 0 | 100.0 | 30 |
| 2.5 | 97.5 | 31 |
| 10.5 | 89.5 | 32 |
| 19.0 | 81.0 | 33 |
| 26.5 | 74.5 | 34 |
| 35.0 | 65.0 | 35 |
| 42.5 | 57.5 | 36 |
| 48.5 | 51.5 | 37 |
| 54.0 | 46.0 | 38 |
| 59.0 | 41.0 | 39 |
| 63.5 | 36.5 | 40 |
| 67.5 | 32.5 | 41 |
| 71.5 | 28.5 | 42 |
| 74.7 | 25.3 | 43 |
| 78.0 | 22.0 | 44 |
| 80.3 | 19.7 | 45 |
| 83.0 | 17.0 | 46 |
| 87.0 | 13.0 | 48 |
| 90.0 | 9.3 | 50 |
| 93.7 | 6.3 | 52 |
| 96.5 | 3.5 | 54 |
| 99.0 | 1.0 | 56 |

| Formic Acid Percent by Volume | Water, Percent | dynes/cm. |
|---|---|---|
| 20 | 80 | 58 |
| 10 | 90 | 63 |
| 5 | 95 | 66 |
| 1 | 99 | 70 |
| 0 | 100 | 72 |

Factors which affect the degree of treatment of the film are the type of discharge apparatus used, the voltage used, the thickness of the film, the distance between the electrode and the film, the time for which the film is exposed to the discharge, and the coating on the ground rod as explained above. For any given apparatus and film the above variables are determined by setting the film traverse speed at about 100 feet per minute, the electrode to film distance of from $\frac{1}{32}''$ to $\frac{1}{8}''$ and varying the voltage or power. After the apparatus has been so set, a sample of biaxially oriented polypropylene film is treated on the apparatus and the degree of treatment is determined by testing the wetability of the surface. The apparatus is then adjusted by any one of the variables to correct either over or under exposure and another sample is tested. When the apparatus has been properly set, the surface of the film need only be tested as quality control criteria dictate.

As an illustration, in the examples below the films were treated by corona discharge utilizing a Lepel unit model HF S.G.–2 high frequency alternating current converter. The output of this unit was connected to a 15 inch adjustable aluminum electrode spaced about $\frac{1}{20}$ of an inch from a grounded roll covered with 30 mils of polyester film or about 60 mils of glazed porcelain. The web traverse speed was adjusted to a rate of 100 feet per minute. Treatment levels were varied by changing the power levels of the Lepel converter. These power settings and the degree of treatment obtained are shown in the examples below.

It might be noted here that the surface of biaxially oriented film can also be conditioned to the proper degree of wetability by flame treatment similar to that used on polyolefin films to increase ink receptivity but not by chemical treatment with chemical agents such as chromic acid. The reason for this is not known.

It is known that the increased wetability gained from the treatment of polypropylene by either flame, chemicals or corona discharge is indicative of a change in the surface polarity. There may be several groups that are responsible for this change in polarity. However, there appears to be little direct correlation between polarity and heat sealability. Often enhanced wetability will not enhance sealability but will enhance the receptivity of the film to inks and coatings.

While applicant does not intend to be bound by theory, it is believed that specific chemical groups must be formed on the surface of the films. It is believed that these groups are activated by heat and upon activation these groups are responsible for the tack sealing properties. The presence of these reactive groups can be detected by heating corona discharge treated biaxially oriented polypropylene film in a toluene solution containing a free radical scavenger, such as 2,2-diphenyl-2'-picryl hydrazyl. Films that are tack sealable affect the free radical scavenger more quickly than those films that are not heat sealable. This would tend to indicate that the presence of free radicals or groups which will produce free radical upon exposure to heat effect or take part in the tack seal mechanism. It is further indicated that flame treatment or corona discharge will produce these radicals or radical precursors but that oxidative chromic acid will not.

An additional fact which should be noted, but which is without explanation, is that the tack sealability can be imparted only to highly biaxially oriented polypropylene film. It cannot be imparted to polypropylene film which contains little or no orientation.

Another aspect of the present invention is a method of increasing the tenacity of the tack seal by heating or annealing the seal. It has been found that if the tack sealed polypropylene film is heated at a temperature of from 100° C. to 120° C. for a period of from 5 to 60 minutes the tensile strength of the seal strength is considerably increased. This effect is however exactly opposite from the effect observed from heat annealed biaxially oriented polypropylene film tack sealed subsequent to the annealing step. In this instance the seal is always weaker and if annealed at a temperature of 100° C. or above for a period of 60 minutes or more the film almost completely loses its ability to effect a tack seal. This loss of tack seal strength upon prior annealing can be used to advantage however if weak seals are desired as in the case of "easy open" seals.

The biaxially oriented polypropylene film which can be used in the present invention is film made from polypropylene having a density of from 0.88 to 0.915, and an intrinsic viscosity of from 2.0 to 4.5 inclusive. The film can have a thickness of from 0.25 to 2.5 mils inclusive, and should be biaxially oriented by at least a factor of 5 and preferably a factor of 6 or more.

Heat sealing the biaxially oriented polypropylene film is effected by placing two surfaces of the film in intimate contact such that at least one and preferably both of these surfaces have been conditioned as described above, and thereafter heating the contact to a temperature sufficiently high to effect a tack seal yet below the shrink temperature of the film.

The melting point of biaxially oriented polypropylene film is generally from about 290° F. to about 340° F. The shrink temperature of this film is generally above 260° F. but below the melting point of the film, thus an effective tack seal can be produced at a sealing bar temperature of from 235° F. to 255° F. without shrinking or puckering the film.

In the examples which follow the following tests and techniques were used:

*Tensile test.*—Determination of seal and shear strengths of tack seals was made on an "Instron" Tensile Tester and a crosshead speed of 20 inches per minute was used as further described hereinafter.

*Standard sealing technique.*—Seals were made on a double jaw hot bar type sealer. The upper jaw can be heated to preselected temperature and made to contact the lower, unheated jaw when the film has been placed between the two. The pressure exerted and the time of contact are controllable. The upper sealing member is a Teflon coated steel bar about 12 inches long and $\frac{1}{8}$–1 inch wide. The lower member is high melting rubber pad covered with Teflon coated fiber gloss.

Standard seals were made with a jaw pressure of 20 p.s.i. at a temperature of 250° F. for a dwell period of 0.5 second and unless otherwise indicated all seals were made by this technique.

In the examples that follow biaxially oriented polypropylene film having a melting point of 338° F. and a shrink temperature of 270° F. was conditioned to various degrees of wetability as indicated, through exposure to electrostatic corona discharge on the apparatus described above. The instrument settings of the Lepel unit for these treatment levels for 1 mil film having a web speed of 100 feet per minute are shown in Table II below.

minute. Each seal was evaluated for both peel strength and shear strength.

The wetability of each sample, sealing temperature, sealing time, and seal strengths are indicated below in Table III.

TABLE III
*Heat Seal Data on Corona Discharge Treated Biaxially Oriented Polypropylene Films*

| Surface Treatment Level (Surface Tension of Liquid that Wets Surface of Film) dynes/cm. | Indicated Temperature of Sealing Bar, °F. | Dwell Time of Sealing Jaws, Seconds | Surface Sealed [1] | Seal Strength of one-inch Wide Samples in grams | | Film Thickness, Mils |
|---|---|---|---|---|---|---|
| | | | | Peel | Shear | |
| 36–37 [2] | 255 | 0.5 | T/T | 18 | 100 | 1 |
| 39–40 [2] | 235 | 0.5 | T/T | 9 | 54 | 1 |
| 39–40 | 255 | 0.5 | T/T | 18 | 110 | 1 |
| 42–43 [2] | 235 | 0.5 | T/T | 26 | 110 | 1 |
| 42–43 | 255 | 0.5 | T/T | 82 | 800 | 1 |
| 44–45 [2] | 235 | 0.5 | T/T | 86 | 820 | 1 |
| 44–45 | 255 | 0.5 | T/T | 212 | 1,300 | 1 |
| 46–48 [2] | 230 | 0.5 | T/T | 48 | 1,500 | 1 |
| 46–48 | 255 | 0.5 | T/T | 196 | <2,000 | 1 |
| 50 | 240 | 0.5 | T/T | 300 | 7,000 | 1 |
| 54–56 [2] | 235 | 0.5 | T/T | 110 | <2,000 | 1 |
| 55 [3] | 250 | 0.5 | T/T | 198 | 4,000 | 1 |
| 60 [3] | 250 | 0.5 | T/T | 300 | <7,000 | 1 |
| 65 [3] | 250 | 0.5 | T/T | 200 | 8,000 | 1 |
| 70 [3] | 250 | 0.5 | T/T | 200 | <7,500 | 1 |
| 30 (not treated) | 260 | 0.5 | uT/uT | <5 | 5 | 1 |
| 56–72 [2] | 235 | 0.5 | T/T | 18 | 132 | 1 |
| 56–72 [2] | 250 | 0.5 | T/T | 32 | 144 | 1 |
| 72 [2] | 235 | 0.5 | T/T | 9 | 122 | 1 |
| 72 [2] | 250 | 0.5 | T/T | 23 | 164 | 1 |

All seals produced were free of distortion.
[1] T/T Treated to treated. uT/uT Untreated to untreated.
[2] Treated using polyester coated iron ground rod.
[3] Treated using porcelain coated iron ground rod.

From Table III above, it can be seen that tack seals on biaxially oriented polypropylene film are much greater for corona discharge treated film, that the seals produced are stronger when both contact surfaces have been treated, and that the optimum degree of electrostatic treatment, as indicated by wetability and power requirements is that

*Discharge apparatus power settings for various degrees of film treatment when utilizing a polyester coated ground rod and when using a porcelain coated ground rod*

TABLE II

| Type of Ground Rod Coating | Surface Tension of Liquid That Wets Treated Film, dynes/cm. | Distance of Electrode From Ground Bar in Inches | Power Range | Power Control | Watts | Amps |
|---|---|---|---|---|---|---|
| 30 mil polyester | 36–37 | 1/10 | 1 | 9 | 100 | 0.2 |
| Do | 38–39 | 1/20 | 2 | 1 | 100 | 0.3 |
| Do | 39–40 | 1/20 | 2 | 5 | 105 | 0.3 |
| Do | 40–41 | 1/20 | 2 | 10 | 120 | 0.3 |
| Do | 41–42 | 1/20 | 3 | 1 | 135 | 0.3 |
| Do | 45–46 | 1/20 | 3 | 3 | 140 | 0.4 |
| Do | 48–50 | 1/20 | 3 | 7 | 175 | 0.4 |
| Do | 52–54 | 1/20 | 4 | 1 | 260 | 0.4 |
| Do | 54–56 | 1/10 | 4 | 5 | 310 | 0.5 |
| Do | 54–56 | 1/20 | 4 | 10 | 390 | 0.6 |
| Do | 56 | 1/20 | 5 | 5 | 410 | 0.6 |
| Do | 72 | 1/20 | 5 | 10 | 600 | 0.7 |
| Do | 72 | 1/20 | [1] 6 | [1] 5 | 750 | 0.8 |
| 60 mil glazed porcelain | 50–52 | 1/20 | 3 | 5 | | |
| Do | 55–56 | 1/20 | 4 | 9 | | |
| Do | 60 | 1/20 | 4 | 1 | | |
| Do | 65 | 1/20 | 5 | 6 | | |
| Do | 70 | 1/20 | 6 | 6 | | |

[1] Film was burned in spots.

EXAMPLE I

Surface treated, biaxially oriented polypropylene films exhibiting various degrees of wetability were cut into samples about 1–12 inches wide. Two such samples of the same film were held together and sealed by a heated sealing bar pressed against the film using the standard tack sealing technique described above (film at their point of contact). Tack seals were made on treated to untreated and treated to treated surfaces. The tack seal was then evaluated by cutting the sealed specimen into samples 1 inch wide and placing the samples on an Instron Testing machine having a cross head speed of 20 inches per minute.

which will produce a surface wetable to a liquid having a surface tension of from 48 to 52 dynes/cm. It can also be seen that above 56 dynes/cm., weaker seals are obtained on treated films which have utilized a polyester coated ground rod than for similar treatment using a porcelain coated ground rod.

EXAMPLE II

*Effect of corona discharge on non-oriented polypropylene film in respect to tack sealability*

Samples of highly biaxially oriented polypropylene film, blown polypropylene film having low orientation and slot cast non-oriented polypropylene film were obtained from the same polypropylene resin. These samples were all treated by corona discharge to the degree of wetability shown and were then subjected to the standard heat seal procedure at the temperature shown. The results are shown below in Table IV.

TABLE IV

| Sample | Type Film | Sealing Temperature, °F. | Surface Tension | Tack Sealability |
|--------|-----------|--------------------------|-----------------|------------------|
| 1 | Highly Bioriented | 250 | 46-48 | Excellent. |
| 2 | ___do___ | 250 | 50-52 | Do. |
| 3 | Blown Low Oriented | 250 | 48-50 | None. |
| 4 | ___do___ | 250 | 50-52 | Do. |
| 5 | ___do___ | 260 | 48-50 | Do. |
| 6 | ___do___ | 260 | 48-50 | Do. |
| 7 | Slot Cast | 250 | 46-48 | Do. |

*The effect of heat annealing biaxially oriented polypropylene film prior to effecting tack seal*

In order to demonstrate the effect of heat sealing samples of biaxially oriented polypropylene film were treated by corona discharge to a surface tension of 54-56 dynes/cm. Sample strips of this material were placed in an oven at specified temperatures of various periods of time. The effect on wetability or surface tension of the films was noted, and the films were then tack sealed by the standard technique and the seal strength was evaluated for each. The results of this evaluation are shown below in Table V.

Table V

| Sample No. | Oven Temp., °C. | Treatment Time, Minutes | Oven Location Rack/Floor | Seal | Wetability (Dynes/cm.) |
|-----------|-----------------|-------------------------|--------------------------|------|------------------------|
| 1 | No Treatment, Control | | | Excellent | 54-56 |
| 2 | 50 | 120 | Floor | Good | 54 |
| 3 | 50 | 120 | Rack | ___do___ | 54 |
| 4 | 75 | 5 | Floor | Weak | 54 |
| 5 | 75 | 5 | Rack | ___do___ | 54 |
| 6 | 75 | 10 | Floor | Very weak | 48-50 |
| 7 | 75 | 10 | Rack | Weak | 54 |
| 8 | 75 | 15 | Floor | ___do___ | 54 |
| 9 | 75 | 15 | Rack | ___do___ | 54 |
| 10 | 75 | 30 | Floor | ___do___ | 50-54 |
| 11 | 75 | 30 | Rack | ___do___ | 50-54 |
| 12 | 100 | 1 | Floor | ___do___ | 54 |
| 13 | 100 | 1 | Rack | ___do___ | 50-54 |
| 14 | 100 | 2 | Floor | ___do___ | 54 |
| 15 | 100 | 2 | Rack | ___do___ | 54 |
| 16 | 100 | 5 | Floor | None | 54 |
| 17 | 100 | 5 | Rack | ___do___ | 50-54 |
| 18 | 110 | 1 | Floor | ___do___ | 54 |
| 19 | 110 | 1 | Rack | ___do___ | 54 |
| 20 | 110 | 2 | Floor | ___do___ | 54 |
| 21 | 110 | 2 | Rack | ___do___ | 54 |
| 22 | 110 | 5 | Floor | ___do___ | 54 |
| 23 | 110 | 5 | Rack | ___do___ | 50 |

The evaluations in Table I as to seal are as follows:

| | Grams |
|---|---|
| Good | $\sqrt{}$200 |
| Weak | <100 |
| Poor | <25 |
| None | 0 |

EXAMPLE IV

*Treatment of biaxially oriented polypropylene film with chromic acid solution to determine the effect on surface tension and tack sealability*

A chromic acid solution was prepared by dissolving 92 grams of sodium dichromate dihydrate in 458 milliliters of water. To this solution was slowly added 800 cubic centimeters of technical grade sulfuric acid. This solution was placed in a large glass beaker and three 1 inch strips of biaxially oriented polypropylene were immersed at room temperature. The strips were removed after a treatment period of 5, 10 and 20 minutes. The surface tension for the films is shown below.

| Treatment time: | Surface tension of film dynes/cm. |
|---|---|
| 0 minute | 30-32 |
| 5 minutes | 42-44 |
| 10 minutes | 50-51 |
| 20 minutes | 52 |

Tack sealing was then attempted on these films by the standard tack sealing technique. No tack seal could be produced on either the untreated or the treated film below the shrinkage or deorientation temperature of the film.

These results indicate that the tack seal effect is not produced by polarity or oxidative effect of the film surface alone, but rather some other mechanism effected by corona discharge.

EXAMPLE V

*The effect of heat annealing biaxially oriented polypropylene film subsequent to effecting tack seal*

In order to determine the effect of heat annealing, tack sealed, biaxially oriented polypropylene film, strips of this film material, which had been treated by corona discharge to a wetability of 55 dynes/cm. surface tension were heat sealed by the standard technique. These sealed strips were then annealed in an oven at various temperatures for different annealing periods. At the end the annealing period the sealed strips were removed and evaluated for strength of seal in respect to both peel and shear. The results of these evaluations were shown below in Table VI.

TABLE VI

| Sample No. | Time, minutes | Temperature, °C. | Type Tensile | Tensile Weight of Seal, grams |
|-----------|---------------|------------------|--------------|------------------------------|
| 1 | Control | None | Peel / Shear | 20.5 / 275 |
| 2 | 5 | 120 | Peel / Shear | 122 / 4,100 |
| 3 | 10 | 120 | Peel / Shear | 104 / 6,650 |
| 4 | 30 | 120 | Peel / Shear | 68 / 4,760 |
| 5 | 60 | 120 | Peel / Shear | 45.5 / 3,450 |
| 6 | 30 | 100 | Peel / Shear | 36.4 / 3,040 |
| 7 | 60 | 100 | Peel / Shear | 54.4 / 2,540 |

The results of these evaluations as shown in Table VI above clearly demonstrate the effective increase in seal strength both in the peel and in the shear effected by annealing the tack seal.

EXAMPLE VI

*Comparison of film treated by apparatus using polyester coated ground with and apparatus using porcelain coated ground rod*

Highly biaxially oriented polypropylene film was treated in the Lepel unit described above first using the polyester coated ground rod and then using the porcelain coated ground rod. In each case the traverse rate of the film was 100 feet per minute. The power settings for each run and the degree of wettability achieved is shown in Tables VII-A and VII-B below.

TABLE VII-A
*Discharge through film to polyester coated iron rod*

| Sample | Distance of Film From Electrode, inch | Power Range | Power Control | Watts | Amps | Surface Tension, dynes/cm. |
|---|---|---|---|---|---|---|
| 1  | 1/20 | 1 | 1  |       |      |       |
| 2  | 1/20 | 1 | 2  |       |      |       |
| 3  | 1/20 | 1 | 3  |       |      |       |
| 4  | 1/20 | 1 | 4  |       |      |       |
| 5  | 1/20 | 1 | 5  | No Discharge | | |
| 6  | 1/20 | 1 | 6  |       |      |       |
| 7  | 1/20 | 1 | 7  |       |      |       |
| 8  | 1/20 | 1 | 8  |       |      |       |
| 9  | 1/20 | 1 | 9  |       |      |       |
| 10 | 1/20 | 1 | 10 |       |      |       |
| 11 | 1/20 | 2 | 1  | 100   | 0.3  | 38-39 |
| 12 | 1/20 | 2 | 3  | >100  | 0.3  | 38-39 |
| 13 | 1/20 | 2 | 5  | 105   | 0.3  | 39-40 |
| 14 | 1/20 | 2 | 7  | 115   | 0.3  | 39-40 |
| 15 | 1/20 | 2 | 10 | 120   | 0.3  | 40-41 |
| 16 | 1/20 | 3 | 1  | 135   | 0.32 | 45-46 |
| 17 | 1/20 | 3 | 3  | 140   | 0.35 | 48-50 |
| 18 | 1/20 | 3 | 5  | 150   | 0.36 | 48-50 |
| 19 | 1/20 | 3 | 7  | 175   | 0.36 | 52-54 |
| 20 | 1/20 | 3 | 10 | 200   | 0.40 | 52-54 |
| 21 | 1/20 | 4 | 1  | 260   | 0.48 | 52-54 |
| 22 | 1/20 | 4 | 3  | 290   | 0.50 | 52-54 |
| 23 | 1/20 | 4 | 5  | 310   | 0.52 | 54-56 |
| 24 | 1/20 | 4 | 7  | 350   | 0.55 | 54-56 |
| 25 | 1/20 | 4 | 10 | 390   | 0.59 | 54-56 |

TABLE VII-B

| Sample | Distance Electrode to Film, inch | Power Range | Power Control | Surface Tension, dynes/cm. |
|---|---|---|---|---|
| 1 | 1/8  | 3 | 5 | 50 |
| 2 | 1/8  | 4 | 9 | 55 |
| 3 | 1/32 | 4 | 1 | 60 |
| 4 | 1/32 | 5 | 6 | 65 |
| 5 | 1/32 | 6 | 6 | 70 |

From Tables VII-A and VII-B above it can be seen that much higher levels of treatment are obtained through the use of a porcelain coated ground rod. It should be additionally noted that the treating effect is much more uniform over the entire film when using this type of ground rod.

*Standard tensile strength of the tack seals*

The tack seal strength was determined by tack sealing the specimens in 1 inch widths. Adjacent ends of the sealed films were mounted in the jaws of an "Instron" tensile tester having a cross head speed of 20 inches per minute to determine peel strength. The same procedure was followed in determining shear tensile strength except that opposite ends of the opposing films were placed in the jaws in order to exert shear. The readings from the scale of the tensile apparatus were recorded at point of delamination.

What is claimed is:
1. The method of tack sealing biaxially oriented polypropylene film which comprises conditioning the surface of said film by exposure to electrostatic discharge until said surface can be wet by a liquid having a surface tension of from 43 to 70 dynes/cm., placing two such films in intimate contact such that at least one contact surface is a conditioned surface, and heating the contacted surfaces to an interface temperature of from 235° F. to 255° F. inclusive.
2. The method of claim 1 wherein the film is conditioned until it can be wet by a liquid having a surface tension of from 48 to 52 dynes per centimeter.
3. The method of claim 1 wherein the electrostatic discharge is corona discharge.
4. The method of tack sealing biaxially oriented polypropylene film which comprises conditioning the surface of said film by exposure to electrostatic discharge until said surface can be wet by a liquid having a surface tension of from 43 to 70 dyne/centimeters, placing two such films in intimate contact, such that at least one contact surface is a conditioned surface and sealing said films by heating the contacted surfaces to an interface temperature of from 235° F. to 255° F. inclusive and thereafter annealing said seal at a temperature of from 100° C. to 120° C. for a period of from 5 to 60 minutes.
5. The method of tack sealing biaxially oriented polypropylene film which comprises conditioning the surface of said film by exposure to flame until said surface can be wet by a liquid having a surface tension of from 43 to 70 dynes/cm., placing two such films in intimate contact such that at least one contact surface is a conditioned surface, and heating the contacted surfaces to an interface temperature of from 235° F. to 255° F. inclusive.

References Cited by the Examiner

UNITED STATES PATENTS 2,795,820   6/1957   Grow et al.
2,927,047   3/1960   Schulde.
3,159,520   12/1964  Harrison et al. _____ 156—272

EARL M. BERGERT, *Primary Examiner.*

DOUGLAS J. DRUMMOND, *Examiner.*